United States Patent
Inoue et al.

(10) Patent No.: US 8,173,892 B2
(45) Date of Patent: May 8, 2012

(54) DYE-SENSITIZED PHOTOELECTRIC CONVERSION DEVICE AND METHOD FOR MANUFACTURING SAME

(75) Inventors: Teruhisa Inoue, Tokyo (JP); Takayuki Hoshi, Tokyo (JP); Tsutomu Namiki, Tokyo (JP); Koichiro Shigaki, Tokyo (JP); Masayoshi Kaneko, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 583 days.

(21) Appl. No.: 12/083,527

(22) PCT Filed: Oct. 20, 2006

(86) PCT No.: PCT/JP2006/320949
§ 371 (c)(1),
(2), (4) Date: Apr. 14, 2008

(87) PCT Pub. No.: WO2007/046499
PCT Pub. Date: Apr. 26, 2007

(65) Prior Publication Data
US 2009/0250104 A1  Oct. 8, 2009

(30) Foreign Application Priority Data
Oct. 21, 2005  (JP) .................... 2005-306605

(51) Int. Cl.
*H01L 31/042* (2006.01)
(52) U.S. Cl. ........................ 136/251; 136/263
(58) Field of Classification Search ............ 136/251, 136/259
See application file for complete search history.

(56) References Cited

U.S. PATENT DOCUMENTS
2004/0238026 A1* 12/2004 Miyoshi ................. 136/263
2007/0125420 A1*  6/2007 Ezure et al. ............ 136/263

FOREIGN PATENT DOCUMENTS
| EP | 0 855 726 A1 | 7/1998 |
| EP | 1 548 867 A1 | 6/2005 |
| EP | 1548867 A1 * | 6/2005 |
| JP | 7-288142 | 10/1995 |

(Continued)

OTHER PUBLICATIONS
Kojima, machine translation of JP 2004-119149A, Apr. 15, 2004.*

(Continued)

*Primary Examiner* — Jennifer Michener
*Assistant Examiner* — Miriam Berdichevsky
(74) *Attorney, Agent, or Firm* — Nields, Lemack & Frame, LLC

(57) ABSTRACT

Disclosed is a photoelectric conversion device comprising a first conductive support having a layer containing a semiconductor, a second conductive support arranged opposite to the first conductive support and having a counter electrode, and a charge transfer layer interposed between the first conductive support and the second conductive support at a certain distance from the supports, and a sealing agent which is arranged around the charge transfer layer in the form of a single or more than single layer for bonding the first conductive support and the second conductive support together.

10 Claims, 3 Drawing Sheets

FOREIGN PATENT DOCUMENTS

| | | |
|---|---|---|
| JP | 8-259543 | 10/1996 |
| JP | 2000-30767 A | 1/2000 |
| JP | 2000-306605 | 11/2000 |
| JP | 2004-95248 | 3/2004 |
| JP | 2004-119149 | 4/2004 |
| JP | 2004-119149 A | 4/2004 |
| JP | 2004119149 A * | 4/2004 |
| JP | 2004-362793 | 12/2004 |
| JP | 2005-172591 A | 6/2005 |
| JP | 2005-213470 A | 8/2005 |
| JP | 2006-100069 | 4/2006 |
| WO | 95/18456 | 7/1995 |
| WO | 00/48212 A1 | 8/2000 |
| WO | WO 2005015678 A1 * | 2/2005 |

OTHER PUBLICATIONS

Chinese communication dated May 8, 2009, with English translation.*
Nature vol. 353, Oct. 24, 1991; pp. 737-740; Pieter G. Schouten et al.; "Charge migration in supramolecular stacks of peripherally substituted porphyrins".
J.Am.Chem.Soc. 1993, 115, 6382-6390; M.K. Nazeeruddin et al.; "Conversion of light to electricity by cis-x2Bis(2,2'-bipyridyl-4,4'-dicarboxylate)ruthenium(II) Charge-Transfer Sensitizers (X=Cl-,Br-,I-,CN-, and SCN-) on Nanocrystalline TiO2 Electrodes".
International Search Report dated Jan. 30, 2007.
European communication dated Aug. 9, 2010 in corresponding foreign application (EP06822010).

* cited by examiner (a)            (b)

dye-sensitized solar cell in 1991. This is also called a Graetzel cell comprising: a thin film substrate serving as one electrode, the thin film substrate being sensitized with a dye on a transparent conductive substrate and composed of oxide semiconductor microparticles; a substrate comprised of a counter electrode, the counter electrode being arranged with a reducing agent such as platinum, the substrate being arranged so as to face the thin film substrate; and a charge transfer layer (electrolyte containing a redox material) interposed between the thin film substrate and the substrate. Here, adsorption of a ruthenium complex dye to a porous titanium oxide electrode has permitted this type photoelectric cell to have a performance close to that of the silicon solar cell (non-Patent Document 1). However, for the purpose of practical application of the dye-sensitized solar cell, exhibiting high efficiency and improving durability in a large-sized practical cell are essential, and thus there has been a need for improvement from these aspects.

DYE-SENSITIZED PHOTOELECTRIC CONVERSION DEVICE AND METHOD FOR MANUFACTURING SAME

TECHNICAL FIELD

The present invention relates to methods for producing photoelectric conversion devices, and more specifically, to a method for producing dye-sensitized photoelectric conversion devices having a thin film of a semiconductor that is sensitized with a dye.

BACKGROUND ART

Solar cells attracting an attention as a clean energy source have been used for ordinary houses in recent years; however, they have not yet been widely spread. The reasons therefor include that the module is obliged to be enlarged because the performance of a solar cell itself is hardly excellent enough, that the productivity in manufacturing the module is low, that as a result the solar cell itself becomes expensive, and the like.

Graetzel (Switzerland) et al. developed a photoelectric (solar) cell using a photoelectric conversion device called a dye-sensitized solar cell in 1991. This is also called a Graetzel cell comprising: a thin film substrate serving as one electrode, the thin film substrate being sensitized with a dye on a transparent conductive substrate and composed of oxide semiconductor microparticles; a substrate comprised of a counter electrode, the counter electrode being arranged with a reducing agent such as platinum, the substrate being arranged so as to face the thin film substrate; and a charge transfer layer (electrolyte containing a redox material) interposed between the thin film substrate and the substrate. Here, adsorption of a ruthenium complex dye to a porous titanium oxide electrode has permitted this type photoelectric cell to have a performance close to that of the silicon solar cell (non-Patent Document 1). However, for the purpose of practical application of the dye-sensitized solar cell, exhibiting high efficiency and improving durability in a large-sized practical cell are essential, and thus there has been a need for improvement from these aspects.

With regards to injection of a charge transfer layer in a general dye-sensitized solar cell, a method for injecting this from an injection port as shown in FIG. 1 is used for preparation of the dye-sensitized solar cell. That is, in the method in FIG. 1, two injection ports used for injecting a charge transfer layer are opened in one of conductive supports in advance with an atmospheric injection method utilizing capillary phenomenon, and then the charge transfer layer is injected from the injection ports after bonding both conductive supports together with a sealing agent, and subsequently the injection ports are sealed using a sealing agent. For the charge transfer layer of the dye-sensitized solar cell prepared in this way, an iodine-based electrolyte pair dissolved into an electrolyte solvent, such as an electrochemically stable organic solvent, is used. However, in such electrochemical conversion device, the charge transfer layer, for example, erodes the cured sealing agent layer during a long period of operation or storage, so that the charge transfer layer will leak or be depleted. For this reason, such electrochemical conversion device has the disadvantage of being impractical for use because the photoelectric conversion efficiency drops significantly or the electrochemical conversion device will not function as the photoelectric conversion device.

In addition, since the above-described method comprises a step of manufacturing an empty cell once, a step of injecting a charge transfer layer, and a step of sealing an injection port, it may generally require a long hours of work and have limited productivity of the photoelectric conversion devices. That is, if the step of manufacturing an empty cell and the step of injecting a charge transfer layer among the above-described steps can be continuously carried out, it is convenient in exhibiting high productivity of the photoelectric conversion devices. However, generally, an isobutylene resin-based sealing agent used in the photoelectric conversion devices, which are prepared using an "electrolyte solution dropping method" shown in the present application, lacks of the adhesive strength, while in the case of the photoelectric conversion devices using a sealing agent that is used in a liquid crystal, the leakage and the like of an electrolyte solution containing iodine is an issue. At present, a high-performance sealing agent used for the photoelectric conversion devices that can clear all these problems has not been found yet.

Under such situation, a photoelectric conversion device using a solid electrolyte pair, and also a photoelectric conversion device containing a solid electrolyte pair using a crosslinked polyethylene oxide-based high molecular compound have been proposed in Patent Document 1 and non-Patent Document 2, respectively. However, the photoelectric conversion devices using such solid electrolyte pair have poor photoelectric conversion characteristics, in particular, an insufficient short circuit current density, and additionally have insufficient durability. Moreover, in order to prevent the leakage and depletion of the electrolyte solution and improve its durability, there have been disclosed methods for using a pyridinium salt, an imidazolium salt, a triazonium salt, or the like as the electrolyte pair salt (Patent Document 2, Patent Document 3). Such salts are in a liquid state at room temperature, and are called a room temperature molten salt. Even with this method, the cell photocurrent will gradually decrease due to the leakage or depletion of the charge transfer layer, so that sufficient durability cannot be obtained.

Patent Document 1: JP-A-07-288142
Patent Document 2: WO 95/18456
Patent Document 3: JP-A-08-259543
Non-Patent Document 1: Nature, vol. 353, 1991, pp. 737-740
Non-Patent Document 2: J. Am. Chem. Soc. 115 (1993) 6382

DISCLOSURE OF THE INVENTION

Problems to be Solved by the Invention

It is the primary object of the present invention to provide a method for efficiently producing dye-sensitized photoelectric conversion devices that are excellent in durability.

Means for Solving the Problems

As the result of extensive investigations to solve the above-described problems, the present inventors have succeeded in obtaining photoelectric conversion devices excellent in durability by dropping an electrolyte solution on the inner side of the innermost bank of sealing agent, the sealing agent being arranged in the form of double or more layers.

That is, the present invention has the following configurations.

(1) A photoelectric conversion device comprising: a first conductive support having a layer containing a semiconductor; a second conductive support arranged opposite to the first conductive support and having a counter electrode; a charge transfer layer interposed between the first conductive support and the second conductive support at a predetermined distance from the supports; and a sealing agent which is arranged around the charge transfer layer in the form of single layer or double or more layers for bonding the first conductive support and the second conductive support together.

(2) The photoelectric conversion device according to (1), wherein the sealing agent is arranged in the form of double or more layers, and a composition of the sealing agent used in a portion which contacts the charge transfer layer differs from that of the sealing agent in a portion which does not contact the charge transfer layer.

(3) The photoelectric conversion device according to (1) or (2), wherein the sealing agent is a sealing agent containing a resin which is cured with heat and light.

(4) The photoelectric conversion device according to (3), wherein the sealing agent is a polyisobutylene resin-based sealing agent containing a polyisobutylene-based resin.

(5) The photoelectric conversion device according to any one of (1) to (4), wherein a plurality of cells exist inside a pair of the first conductive support and the second conductive support, each cell being arranged in series electrically.

(6) The photoelectric conversion device according to any one of (1) to (5), wherein a collecting electrode is arranged on the first conductive support, and a foundation thin film layer made from a semiconductor precursor is provided on the collecting electrode.

(7) The photoelectric conversion device according to (5), wherein when the sealing agent is arranged in the form of double or more layers, the sealing agent serving as the innermost bank is an isobutylene resin-based sealing agent.

(8) The photoelectric conversion device according to (7), wherein the sealing agent serving as the innermost bank is an isobutylene resin-based sealing agent, and a sealing agent serving as a bank on the first outer side thereof is a thermosetting resin-based sealing agent or a combined photocurable and thermosetting resin-based sealing agent.

(9) The photoelectric conversion device according to (8), wherein a distance between the sealing agent serving as the innermost bank and a sealing agent serving as the bank on the first outer side thereof is in the range of 0 to 1 mm.

(10) The photoelectric conversion device according to (9), wherein a distance between the sealing agent serving as the innermost bank and a layer containing a semiconductor arranged on a further inner side thereof is in the range of 0 to 1 mm.

(11) A method for producing a photoelectric conversion device comprising: a first conductive support having a layer containing a semiconductor; a second conductive support arranged opposite to the first conductive support and having a counter electrode; and a charge transfer layer interposed between the both supports at a predetermined distance from the both supports, the method including steps of: arranging a predetermined amount of droplet of the charge transfer layer onto one of the conductive supports; and then bonding the other support thereto via a bank of sealing agent which is provided on this support before or after the arrangement of the droplet.

(12) The method for producing the photoelectric conversion device according to (11), further comprising steps of: providing a bank of sealing agent onto at least either one of the both conductive supports by a printing method or a dispensing method: and then arranging a predetermined amount of droplet of the charge transfer layer into a region surrounded by the bank on the conductive support and subsequently bonding the both conductive supports together.

(13) The method for producing the photoelectric conversion device according to (11) or (12), wherein the step of bonding the both conductive supports together is carried out under a reduced pressure.

(14) The method for producing the photoelectric conversion device according to any one of (11) to (13), wherein the bank of sealing agent is provided in the form of double or more layers around at least either one of the conductive supports.

(15) The method for producing the photoelectric conversion device according to any one of (11) to (14), wherein the bank of sealing agent is provided in the form of double or more layers around at least either one of the conductive supports, and a composition of a sealing agent used in a bank which contacts the charge transfer layer differs from that of a sealing agent used in a bank which does not contact the charge transfer layer.

(16) The method for producing the photoelectric conversion device according to any one of (13) to (15), further comprising a step of substituting air with an inert gas before carrying out the bonding step under a reduced pressure.

(17) The method for producing the photoelectric conversion device according to any one of (11) to (16), wherein the sealing agent is a sealing agent containing a resin which is cured with heat and/or light.

(18) The method for producing the photoelectric conversion device according to (17), wherein the sealing agent is a polyisobutylene resin-based sealing agent containing a polyisobutylene-based resin.

(19) The method for producing the photoelectric conversion device according to (11) or (12), further comprising a step of arranging a droplet of a charge transfer layer into a plurality of regions provided on the first conductive support, each region being surrounded by the bank in the form of single layer or double or more layers, wherein the photoelectric conversion device includes a plurality of cells in an interior of a pair of conductive supports obtained by bonding the second conductive support and the first support together, each cell being arranged in series electrically.

(20) The method for producing the photoelectric conversion device according to any one of (11) to (19), wherein the conductive support having a layer containing a semiconductor is the one, in which a collecting electrode is arranged on the conductive support and subsequently a foundation thin film layer made from a semiconductive precursor is provided on the collecting electrode.

(21) The method for producing the photoelectric conversion device according to any one of (11) to (20), wherein a total area of the layer which contacts the charge transfer layer and contains a semiconductor is no less than 50% of the area of the conductive support.

Effect of the Invention

In the method for producing a dye-sensitized photoelectric conversion device of the present invention, there is no need for spending time and effort in injecting an electrolyte solution after producing an empty cell and for sealing the injection port, so that the production process can be reduced significantly. Moreover, because the dye-sensitized photoelectric conversion device produced in accordance with the present invention is reliable in the adhesion between substrates (supports) for forming cells and in particular it has no injection port on the substrates, the dye-sensitized photoelectric conversion device can exhibit a stable photoelectric conversion performance while securing the long term reliability, durability, and persistence in the photoelectric conversion function. Furthermore, since the step of injecting a charge transfer layer is not required, a dye-sensitized photoelectric conversion device with a large area can be advantageously produced.

BRIEF DESCRIPTION OF THE DRAWINGS

FIGS. 2 (a) to (f) illustrate chronological production steps in an exemplary embodiment (and Example 1) according to the present invention. FIG. 2 (g-1) and FIG. 2 (g-2) illustrate a top view and cross sectional view of the photoelectric conversion device in this embodiment.

DESCRIPTION OF THE REFERENCE SYMBOLS

Figure 1:
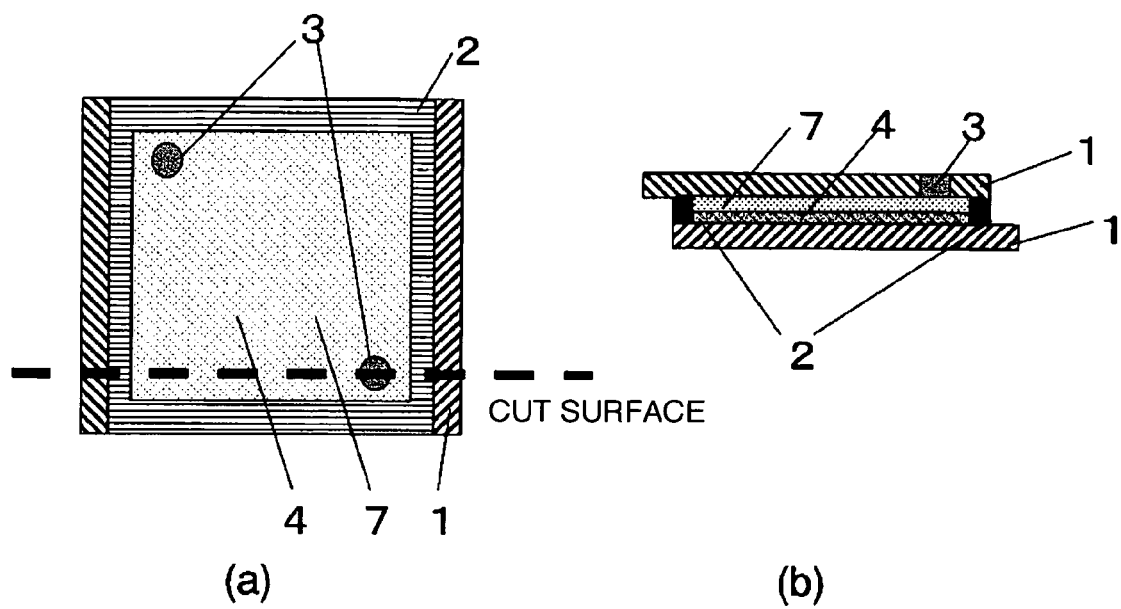
FIG. 1 illustrates a photoelectric conversion device (FIG. 1 (a)) in accordance with a conventional production method and a schematic cross sectional view of the principal part (FIG. 1 (b)).

The reference symbols in FIG. 1 to FIG. 4 represent the followings. Note that an element with the same name in each view is given the same reference symbol.
1 conductive support (prior art)
1a conductive support (present invention)
1b conductive support (present invention)
1c conductive support in which a collecting electrode is arranged (present invention)
1d conductive support in which a collecting electrode is arranged (present invention)
2 sealing agent (prior art)
2a bank of sealing agent (present invention)
2b bank of sealing agent (present invention)
3 injection port
4 charge transfer layer
5 photoelectric conversion device
6 decompression container
7 semiconductor-containing layer
8 conductive material (internal conductive material)
9 counter electrode
10 dropping device
11 lead wire

BEST MODES FOR CARRYING OUT THE INVENTION

Hereinafter, the present invention will be described in detail.

First, substrates and chemicals used for producing a dye-sensitized photoelectric conversion device of the present invention will be described.

A dye-sensitized photoelectric conversion device obtained using the production method of the present invention comprises: a first conductive support having a layer containing a dye-sensitized semiconductor (hereinafter, also referred to as a semiconductor-containing layer); a second conductive support arranged opposite to the first conductive support and having a counter electrode; and a charge transfer layer interposed via a bank of sealing agent between the both conductive supports at a predetermined distance from the both conductive supports. In this method, two types of conductive supports, i.e., a conductive support having a layer containing a dye-sensitized semiconductor and a conductive support serving as a counter electrode, a sealing agent, and a charge transfer layer are used as essential materials.

Then, the conductive support having a layer containing a dye-sensitized semiconductor is described first. Here, as the conductive support, for example, the one (hereinafter, also referred to as a semiconductor-containing layer) obtained by thin-filming a conductive substance (oxide semiconductor), such as FTO (fluorine doped tin oxide), ATO (antimony doped tin oxide), ITO (indium doped tin oxide) or AZO (aluminum doped tin oxide), onto the surface of a substrate made from glass, plastic, polymer film, quartz, silicon, or the like, is used. The conductivity thereof is typically not greater than $1000\,\Omega/cm^2$, preferably not greater than $100\,\Omega/cm^2$. The conductive support is used in the form of film or plate, and the thickness thereof is typically in the range of 0.01 to 10 mm. At least one of the two substrates is constructed using an optically-transparent substrate.

In providing the semiconductor-containing layer, an oxide semiconductor is typically used as the semiconductor, and in particular, a particulate oxide semiconductor is preferably used. Examples of the oxide semiconductor includes an oxide of a transition metal, such as Ti, Zn, Sn, Nb, W, In, Zr, Y, La, or Ta, an oxide of Al, an oxide of Si, a perovskite type oxide, such as $StTiO_3$, $CaTiO_3$, or $BaTiO_3$. Among these, $TiO_2$, ZnO, and $SnO_2$ are particularly preferably used. These metal oxides may be mixed and used, and mixture types, such as $SnO_2/ZnO$, $TiO_2/ZrO_2$, $TiO_2/MgO$, $TiO_2/ZrO_2/SiO_2$, and $TiO_2/Nb_2O_5$ are enumerated as preferable examples. The primary particle diameter of the oxide semiconductor used here is typically in the range of 1 to 200 nm, preferably 1 to 50 nm. In the case of the mixture types, these metal oxides may be mixed in the state of microparticles, or may be mixed in the state of slurry or paste as described below, or furthermore these may be layered to each other for use.

Methods for preparing the semiconductor-containing layer includes: a method for preparing a thin film composed of an oxide semiconductor directly onto a substrate by vapor deposition, a method for electrically precipitating a metal oxide semiconductor using the substrate as an electrode; and a method for applying or coating a slurry or paste of a metal oxide semiconductor onto a substrate and then drying, and curing or calcining the substrate. In terms of the performance as an electrode having an oxide semiconductor-containing layer, the method for using a slurry or paste and applying the same onto a substrate is preferable. A slurry is obtained by dispersing secondarily-aggregated semiconductor microparticles into a dispersion medium using a dispersant so that the average primary particle diameter may be typically in the range of 1 to 200 nm, or by hydrolyzing a metal alkoxide or the like using a sol gel method (see non-Patent Document 1). Moreover, semiconductor microparticles of different particle diameters may be mixed and used.

Here, as the dispersion medium for dispersing the slurry, any one capable of dispersing metal oxide semiconductor microparticles may be used, and, for example, water, alcohol such as ethanol, ketone such as acetone and acetylacetone, and an organic solvent of hydrocarbon such as hexane, are used. These may be mixed and used, and a use of water is preferable in reducing a viscosity change of the slurry.

It is also possible to add a dispersion stabilizer or the like to the slurry for the purpose of obtaining stable primary microparticles. Examples of the dispersion stabilizer to be used include: a polyhydric alcohol such as polyethylene glycol, and a monohydric alcohol, such as phenol, and an octyl alcohol, or the like, or a copolycondensate product of such polyhydric alcohol and monohydric alcohol; cellulose derivatives, such as hydroxypropyl methylcellulose, hydroxymethyl cellulose, hydroxyethyl cellulose, and carboxymethyl cellulose; polyacrylamide; acrylamide, a (meth)acrylic acid or its salt, and a (meth)acrylic ester (methyl (meth)acrylate, ethyl (meth)acrylate, or the like), or the like, or a copolycondensate product of such acrylamide, (meth)acrylic acid or its salt, or (meth)acrylic ester; a polyacrylic acid derivative, which is water-soluble and is a copolymer of acrylamide, (meth) acrylic acid or its salt, (meth)acrylic ester, or the like, and a hydrophobic monomer, such as styrene, ethylene, propylene, or the like; salts of a melaminesulfonic acid formaldehyde condensation product; salts of a naphthalenesulfonic acid formaldehyde condensation product; high-molecular weight ligninsulfonic acid salt; and acids such as hydrochloric acid, nitric acid, and acetic acid, but not limited to these dispersion stabilizers. Among these, a polyhydric alcohol, such as polyethylene glycol, and a monohydric alcohol, such as phenol, or an octyl alcohol, or the like, or a copolycondensate product of such polyhydric alcohol and monohydric alcohol; poly(meth) acrylic acid, sodium poly(meth)acrylate, potassium poly (meth)acrylate, lithium poly(meth)acrylate, carboxymethyl cellulose, hydrochloric acid, nitric acid, acetic acid, and the like are enumerated as preferable examples. Moreover, these dispersion stabilizers may be not only used individually but also used in combination of two or more kinds thereof.

The concentration of the metal oxide semiconductor microparticle in the slurry is typically in the range of 1 to 90 wt %, preferably 5 to 80 wt %.

Next, the above-described slurry is applied onto the substrate by a screen printing, spin coating, squeegee method, or the like so that the thickness on a dry basis may be in the range of 1 to 200 μm, preferably 2 to 100 μm. Preferably, the substrate coated with the slurry is dried and then calcined at not higher than a melting point (or softening temperature) of the substrate used. The calcination is carried at temperature not higher than a melting point (or softening temperature) of the substrate used, typically in the range of 100° C. to 900° C., preferably 100° C. to 600° C. Moreover, the calcination time is not limited in particular, but is generally within 4 hours.

For the purpose of improving the smoothness in the thin film surface of the semiconductor-containing layer, a secondary treatment may be carried out (see non-Patent Document 1). For example, the smoothness can be improved by dipping the whole substrate, in which a thin film of semiconductor particulates is provided, the thin film of semiconductor particulates being prepared as described above, directly into a solution of alkoxide, chloride, nitride, sulfide or the like of the same metal as that of the metal oxide semiconductor, and then by drying or calcining (re-calcining) the substrate in the same manner as described above. Here, titanium ethoxide, titanium isopropoxide, titanium t-butoxide, n-dibutyl-diacetyltin, or the like is used as the metal alkoxide, and an alcoholic solution thereof is used. In the case of chloride, for example, titanium tetrachloride, tin tetrachloride, zinc chloride, or the like is used, and an aqueous solution thereof is used. The specific surface area of a semiconductor particle of the thin film layer thus obtained is typically in the range of 1 to 1000 m²/g, and in the range of 10 to 500 m²/g in a preferable embodiment.

In addition, a preliminary treatment, such as a treatment of dipping with the above-described solution of a metal alkoxide or the like which serves as the thin film of metal oxide after calcination, or a treatment of precipitating a thin film of metal oxide from a aqueous solution, may be carried out to between the conductive support and the semiconductor-containing thin film. Moreover, when aiming at producing a cell of a large area, a treatment similar to the above-described preliminary treatment can be carried out also to between the collecting electrode and the semiconductor-containing layer to improve the performance while preventing a short circuit. As used herein, a cell of a large area refers to a cell with a width of not less than 5 mm.

Next, a step of causing the semiconductor-containing layer to adsorb a dye used for sensitization (hereinafter, referred to as a sensitizing dye) is described. The sensitizing dye may be a metal complex dye containing a metal element such as ruthenium or an organic dye not containing a metal, or a mixture thereof. Any sensitizing dye having an effect of sensitizing the optical absorption in conjunction with a semiconductor particle can be used without particular limitation.

The method for causing a semiconductor-containing layer to carry a sensitizing dye includes a method for dipping a substrate provided with the above-described semiconductor-containing layer into a solution obtained by dissolving the relevant dye using a solvent capable of dissolving this dye, or a method for dipping the above-described substrate into a dispersion liquid obtained by dispersing a dye, in the case of a dye having low solubility. The concentration of a dye in the solution or dispersion liquid is determined suitably corresponding to the type of the dye. The dipping temperature is generally in the range of normal temperature to the boiling point of the solvent, and the dipping time is typically in the range of about 1 to 48 hours. Solvents to be used for dissolving the sensitizing dye include, for example, methanol, ethanol, acetonitrile, dimethylsulfoxide, dimethylformamide, t-butanol, and the like. The concentration of the sensitizing dye in the solution may be typically in the range of $1 \times 10^{-6}$ M to 1 M, preferably $1 \times 10^{-5}$ M to $1 \times 10^{-1}$ M. In this way, a substrate having a semiconductor-containing layer sensitized with a sensitizing dye is obtained, and is used as the semiconductor electrode in one of the electrodes.

The number of kinds of sensitizing dyes to be adsorbed may be one, or several kinds of sensitizing dyes may be mixed. Moreover, in mixing the sensitizing dyes, organic dyes may be mixed or an organic dye and a metal complex may be mixed. In particular, a mix of dyes having different absorption wavelengths allows a broad absorption wavelength region to be used and also a solar cell with a high conversion efficiency to be obtained. The metal complex to be used in adsorption is not limited in particular, but phthalocyanine, porphyrin, and the like are preferable, for example. Moreover, the organic dyes to be used in adsorption include nonmetallic phthalocyanine or porphyrin; methine dyes, such as cyanine, merocyanine, oxonol, triphenylmethane dyes, an acrylic acid dye; xanthene dyes; azo dyes; anthraquinone dyes; perylene dyes, and the like. Preferable examples include ruthenium complex, merocyanine, and methine dyes such as acrylic acid based-ones. When the dyes are mixed and used, the ratio between the dyes is not limited in particular, and the optimum proportion can be selected depending on the respective dyes used. In general, an equimolar mixture or a mixture containing about 1% by mole or more for each dye is preferably used. When dyes are adsorbed to the semiconductor-containing layer using a solution, in which two or more kinds of dyes are dissolved or dispersed, the concentration of a total of dyes in the solution may be the same as the concentration in a solution containing only one dye. As the solvent for dyes used in combination, solvents as described above can be used and the solvent for each dye used may be the same or different.

When the sensitizing dyes are supported on the semiconductor-containing layer, it is effective to allow the semiconductor-containing layer to carry the sensitizing dyes under the co-presence of a clathrate compound in order to prevent the association of the dyes. Here, the clathrate compounds to be used include a steroid type compound such as cholic acid and the like, crown ether, cyclodextrin, calyx allene, polyethylene oxide, or the like. Examples of preferable clathrate compound include cholic acids, such as cholic acid, deoxycholic acid, cheno-deoxycholic acid, cholic acid methyl ester, sodium cholate, and cholic acid amide, and polyethylene oxide. Moreover, after the dye is carried, the surface of the dye-adsorbed semiconductor-containing layer may be treated with an amine compound such as 4-t-butyl pyridine. As the treatment method, for example, a method for dipping the substrate, on which a semiconductor-containing layer carrying a dye has been provided, into an ethanol solution of an amine compound is employed.

Next, among two conductive supports used in the production method of the present invention, a conductive support different from a semiconductor support, in which a semiconductor-containing layer carrying a dye is provided, is used as the counter electrode. As the counter electrode, for example, the one made by vapor-depositing platinum, carbon, rhodium, ruthenium, or the like, which catalytically act on the reduction reaction of a redox electrolyte, onto the surface of a conductive support, wherein a thin film of conductive material such as FTO (fluorine doped tin oxide) is provided on a glass surface, or the one made by coating and calcining a microparticle of a conductive metal or a precursor thereof onto the surface of the above-described conductive support, is used. Note that as the conductive support for preparing the counter electrode, other than the above-described one, the same one as the conductive support used in providing the semiconductor-containing layer can be used.

Next, the charge transfer layer used in the production method of the present invention is described. As the charge transfer layer, a solution made by dissolving a redox electrolyte, a hole transport material, or the like into a solvent or a room temperature molten salt (ionic liquid) is used, for example. Examples of the redox electrolyte includes a halogen redox electrolyte composed of a halogen molecule and a halogenated compound to which a halogen ion can be a counter ion; a metal redox electrolyte of a metal complex or the like, such as a ferrocyanic acid salt-ferricyanic acid salt, ferrocene-ferricinium ion, and a cobalt complex; and an organic redox electrolyte of alkyl thiol-alkyl disulfide, a viologen dye, hydroquinone-quinone or the like. Among these, the halogen redox electrolyte is enumerated as a preferable example. The halogen molecules in the halogen redox electrolyte composed of a halogenated compound and a halogen molecule include, for example, an iodine molecule, a bromine molecule, and the like, and the iodine molecule is preferable. Moreover, the halogenated compound to which a halogen ion can be a counter ion include, for example, the halogenation metal salts of LiI, NaI, KI, CsI, $CaI_2$, CuI or the like, or the organic quaternary ammonium salts of a halogen, such as tetraalkylammonium iodide, imidazolium iodide, 1-methyl-3-alkylimidazolium iodide, and pyridinium iodide, and the like, but the salts to which an iodine ion can be a counter ion are preferable.

Moreover, when the charge transfer layer is formed in a form of solution containing a redox electrolyte, as the solvent thereof an electrochemically inert one is used. Examples of such solvents include acetonitrile, propylene carbonate, ethylene carbonate, 3-methoxypropionitrile, methoxy-acetonitrile, ethylene glycol, propylene glycol, diethylene glycol, triethylene glycol, dimethoxyethane, diethyl carbonate, diethylether, diethyl carbonate, dimethyl carbonate, 1,2-dimethoxyethane, dimethylformamide, dimethylsulfoxide, 1,3-dioxolane, methyl formate, 2-methyl tetrahydrofuran, 3-methoxy-oxaziridine-2-on, γ-butyrolactone, sulfolane, tetrahydrofuran, water, and the like. Among these, in particular, acetonitrile, propylene carbonate, ethylene carbonate, 3-methoxypropionitrile, methoxyacetonitrile, ethylene glycol, 3-methoxy oxaziridine-2-on, γ-butyrolactone, and the like are preferable. These may be used individually or in a mixture of two or more members thereof. The concentration of the redox electrolyte is typically in the range of 0.01 to 99% by weight, preferably 0.1 to 90% by weight.

Moreover, when the charge transfer layer is formed in a form containing a redox electrolyte, those used as the solvent of the redox electrolyte include a room temperature molten liquid (ionic liquid). Examples of such room temperature molten liquids include 1-methyl-3-alkyl imidazolium iodide, vinyl imidazolium tetrafluoride, 1-ethylimidazole sulfonate, alkylimidazolium trifluoromethane sulfonylamide, 1-methylpyrrolidinium iodide, 1-methyl-3-alkyl imidazolium bis(trifluoromethane sulfonyl)amide, and the like. Moreover, for the purpose of improving the durability of the photoelectric conversion device, it is also possible to dissolve a low-molecular gelatinizer into the charge transfer layer and thereby thicken, or to simultaneously use a reactant component and then allow the same to react after injecting the charge transfer layer, thereby turning this into a gel electrolyte.

On the other hand, as the solid type, a hole transport material and a p-type semiconductor in place of the redox electrolyte can be also used. The hole transport materials to be used include, for example, conductive polymers, such as an amine derivative, polyacetylene, poly aniline, and polythiophene, and a discotic liquid crystal, and the like. Moreover, the p-type semiconductor to be used includes CuI, CuSCN, and the like Furthermore, the sealing agent used in the production method of the present invention is described.

The method for producing a photoelectric conversion device of the present invention includes the steps of: arranging a conductive support having a semiconductor-containing layer (thin film) and a conductive support serving as a counter electrode so as to face to each other with a predetermined distance; arranging a charge transfer layer on one of the conductive supports before bonding these two conductive supports together; and then providing a bank of sealing agent around this conductive support and bonding the other conductive support thereto. The sealing agents to be used in the production method of the present invention include the following types and the like:

(1) A sealing agent primarily composed of a thermosetting resin for bonding two conductive supports together and then curing the bonded one with heat to complete the adhesion;

(2) A sealing agent primarily composed of a photocurable resin for bonding two conductive supports together and then curing the bonded one with light to complete the adhesion; and (3) A sealing agent primarily composed of a resin that is cured with light and heat, for bonding two conductive supports together and then curing the bonded supports with light (first cure) followed by heat (secondary cure) to complete the adhesion.

Examples of a resin suitable for the sealing agent of Type (1) include an epoxy resin, an isobutylene resin, and the like. In this case, the charge transfer layer is arranged before or after the sealing agent is applied so as to provide a bank on the conductive support using a dispenser, a screen printing method, or the like. Then, after carrying out leveling with heating or without heating, the upper and lower conductive supports are bonded together using an alignment mark, and subsequently the sealing agent is cured by a heat treatment.

Moreover, examples of a resin suitable for the sealing agent of Type (2) include an acrylic resin and the like. In this case, the charge transfer layer is arranged before or after the sealing agent is applied so as to provide a bank on the conductive support using a dispenser, a screen printing method, or the like. The upper and lower conductive supports are bonded together using an alignment mark, and subsequently the sealing agent is cured by photo irradiation.

Furthermore, examples of a resin suitable for the sealing agent of Type (3) include an epoxyacrylate resin and the like. In this case, the charge transfer layer is arranged before or after the sealing agent is applied so as to provide a bank on the conductive support using a dispenser, a screen printing method, or the like. In this case, after carrying out leveling with heating or without heating, the upper and lower conductive supports are bonded together using an alignment mark, and subsequently the sealing agent is cured by photo irradiation and a heat treatment.

In the production method of the present invention, Type (3) sealing-agent containing as the major component a resin that is cured with light and heat is preferably used.

Hereinafter, description is made focusing on Type (3) sealing agent containing as the major component a resin that is cured with light and heat (hereinafter, referred to as a "combined photocurable and thermosetting sealing agent").

The combined photocurable and thermosetting sealing agent in a preferable embodiment contains (a) epoxy resin, (b) thermosetting agent (c) epoxy (meth)acrylate, and (d) photopolymerization initiator. These components will be described in detail.

As the epoxy resin (a), an epoxy resin having at least two epoxy groups in one molecule is used. Examples of such epoxy resin includes a novolak type epoxy resin, a bisphenol A-type epoxy resin, a bisphenol F-type epoxy resin, a biphenyl-type epoxy resin, a triphenyl methane-type epoxy resin, and the like. More specifically, bisphenol A, bisphenol F, bisphenol S, fluorene bisphenol, terpenediphenol, 4,4'-biphenol, 2,2'-biphenol, 3,3',5,5'-tetramethyl [1,1,-biphenyl]-4,4,-diol, hydroquinone, resorcinol, naphthalenediol, tris(4-hydroxyphenyl)methane, 1,1,2,2-tetrakis(4-hydroxyphenyl) ethane; condensation polymers of phenols (phenol, alkylation phenol, naphthol, alkylation naphthol, dihydroxybenzene, dihydroxynaphthalene, or the like) and formaldehyde, acetaldehyde, benzaldehyde, p-hydroxybenzaldehyde, o-hydroxybenzaldehyde, p-hydroxyacetophenone, o-hydroxyacetophenone, dicyclopentadiene, furfural, 4,4'-bis (chloromethyl)-1,1'-biphenyl, 4,4'-bis(methoxymethyl)-1,1'-biphenyl, 1,4-bis(chloromethyl) benzene, and 1,4-bis (methoxymethyl) benzene, or the like, and denaturation products thereof; and solid or liquid epoxy resins, such as glycidyl ether products derived from halogenated bisphenols, such as tetrabromo bisphenol A, and alcohols, a cycloaliphatic epoxy resin, a glycidyl amine-based epoxy resin, and a glycidyl ester-type epoxy resin are enumerated, but not limited thereto. These may be used individually or in a mixture of two or more members thereof. These epoxy resins are useful in decreasing the resin viscosity of the sealing agent, thus enabling the bonding work at room temperature and also facilitating the gap formation.

For the combined photocurable and thermosetting sealing agent, generally, the hydrolysable chlorine contained in this sealing agent is preferably as few as possible in order to minimize contamination caused by the sealing agent to the charge transfer layer as much as possible. Also for the epoxy resin (a), an epoxy resin containing fewer hydrolysable chlorine, e.g., not greater than 600 ppm, is preferable. The amount of hydrolysable chlorine can be quantified as follows: for example, about 0.5 g of epoxy resin is dissolved into 20 ml of dioxane, and is refluxed for 30 minutes with a 5 ml of 1N KOH/ethanol solution and then is titrated with a 0.01 N silver nitrate solution.

The content of the epoxy resin (a) is typically in the range of 5 to 80% by weight in the sealing agent.

Next, the thermosetting agent (b) is not limited in particular as long as it can react with an epoxy resin to form its cured material. However, the thermosetting agent with such properties that the combined photocurable and thermosetting sealing agent initiates the reaction (curing) uniformly and immediately without contaminating the charge transfer layer when heated, and that time-dependent change in viscosity is small at room temperature in use is more preferable. Moreover, curability at low temperature, generally at 120° C. for about one hour, is required as the sealing agent in order to minimize the deterioration in characteristics of the charge transfer layer to be used. Considering the above, hydrazides, aromatic amine, acid anhydride, imidazoles, and polyhydric phenols are preferably used as the thermosetting agent, and hydrazides and a polyhydric phenols are more preferably used. For these thermosetting agents, one kind or two kinds or more thereof may be suitably selected and used.

As the hydrazides, polyfunctional dihydrazides having two or more hydrazide groups in a molecule are preferably used. Examples of polyfunctional dihydrazides having two or more hydrazide groups in a molecule include: dibasic acid dihydrazides comprising a fatty acid skeleton of oxalic acid dihydrazide, malonic acid dihydrazide, succinic acid dihydrazide, adipic acid dihydrazide, adipic acid dihydrazide, pimelic acid dihydrazide, suberic acid dihydrazide, azelaic acid dihydrazide, sebacic acid dihydrazide, dodecanoic acid dihydrazide, hexadecanoic acid dihydrazide, maleic acid dihydrazide, fumaric acid dihydrazide, diglycolic acid dihydrazide, tartaric acid dihydrazide, malic acid dihydrazide, or the like; aromatic dihydrazides, such as isophthalic acid dihydrazide, terephthalic acid dihydrazide, 2,6-naphthoate dihydrazide, 4,4-bisbenzene dihydrazide, 1,4-naphthoate dihydrazide, 2,6-pyridinedihydrazide, 1,2,4-benzenetrihydrazide, pyromellitic acid tetrahydrazide, 1,4,5,8-naphthoate tetrahydrazide; and dihydrazides having a valine hydantoin skeleton of 1,3-bis(hydrazinocarbonoethyl)-5-isopropyl hydantoin, but not limited thereto. Among these polyfunctional dihydrazides, particularly preferable ones are isophthalic acid hydrazide and dihydrazides having a valine hydantoin skeleton.

When these polyfunctional dihydrazides are used as the thermosetting agent (b), fine particles thereof homogeneously dispersed are preferably used so as to act as a latent curing agent. Too large average particle diameter of the above polyfunctional dihydrazides would cause a problem of defective gap formation in bonding two substrates (conductive supports) together when the photoelectric conversion device with a narrow gap is produced. Accordingly, the average particle diameter is preferably not larger than 3 μm, and more preferably not larger than 2 μm. For the same reason, the maximum particle diameter of the thermosetting agent (b) is preferably not larger than 8 μm, and more preferably not larger than 5 μm. The particle diameter of the thermosetting agent (b) can be measured using, for example, a laser diffraction-scattering type measuring device of particle diameter distribution (dry type) (LMS-30, manufactured by Seishin Enterprise Co., Ltd.).

As amines used as the thermosetting agent (b), any amines known as the curing agent of an epoxy resin can be used. Examples of preferable amines include diaminodiphenylmethane, diethylenetriamine, triethylenetetramine, diaminodiphenyl sulfone, isophorone diamine, dicyandiamide, or polyamide resins synthesized by ethylenediamine and a dimer of linolenic acid, or the like.

As the acid anhydride used as the thermosetting agent (b), any acid anhydride known as the curing agent of an epoxy resin can be used. Examples of preferable acid anhydrides include phthalic anhydride, trimellitic anhydride, pyromellitic dianhydride, maleic anhydride, tetrahydro phthalic anhydride, methyl tetrahydro phthalic anhydride, methyl nadic anhydride, hexahydro phthalic anhydride, and methyl hexahydro phthalic anhydride.

As imidazole derivatives used as the thermosetting agent (b), any imidazoles known as the curing agent of an epoxy resin can be used. Examples of preferable imidazoles include 2-ethylimidazole, 2-methylimidazole, 2-phenylimidazole, 2-undecylimidazole, 2-heptadecylimidazole, 2-ethyl-4-methylimidazole, 2-phenyl-4-methylimidazole, 1-benzyl-2-phenylimidazole, 1-benzyl-2-methyl imidazole, 1-cyanoethyl-2-methylimidazole, 1-cyanoethyl-2-phenylimidazole, 1-cyanoethyl-2-undecylimidazole, 2,4-dicyano-6(2'-methylimidazole (1')) ethyl-s-triazine, 2,4-dicyano-6 (2'-undecylimidazole (1')) ethyl-s-triazine.

As polyhydric phenols used as the thermosetting agent (b), any polyhydric phenols known as the curing agent of an epoxy resin can be used. It is preferable to use the sealing agent for the photoelectric conversion device of the present invention that advantageously forms a homogeneous system. Examples of such polyhydric phenols include phenol formaldehyde condensation polymer, cresol formaldehyde condensation polymer, hydroxybenzaldehyde phenol condensation polymer, cresol naphthol formaldehyde condensation polymer, resorcinol formalin condensation polymer, furfural phenol condensation polymer, polyfunctional novolaks, such as α-hydroxyphenyl-ω-hydropoly (biphenyl dimethylene hydroxyphenylene), bisphenol A, bisphenol F, bisphenol S, thiodiphenol, 4,4'-biphenyl phenol, dihydroxynaphthalene, fluorene bisphenol, terpene diphenol, 2,2'-biphenol, 3,3',5,5'-tetramethyl-[1,1'-biphenyl]-4,4'-diol, hydroquinone, resorcinol, naphthalenediol, tris-(4-hydroxyphenyl)methane, and 1,1,2,2-tetrakis(4-hydroxyphenyl)ethane; condensation polymers of phenols (phenol, alkylation phenol, naphthol, alkylation naphthol, dihydroxybenzene, or the like) and formaldehyde, acetaldehyde, benzaldehyde, p-hydroxybenzaldehyde, o-hydroxybenzaldehyde, p-hydroxyacetophenone, o-hydroxyacetophenone, dicyclopentadiene, furfural, 4,4'-bis(chloromethyl)-1,1'-biphenyl, 4,4'-bis(methoxymethyl)-1,1'-biphenyl, 1,4'-bis(chloromethyl) benzene, 1,4'-bis(methoxymethyl) benzene, and the like, and denaturation products of these; and halogenated bisphenols, such as tetra promo bisphenol A, condensation product of terpene and phenols.

The amount of the thermosetting agent (b) contained in the combined photocurable and thermosetting sealing agent is typically in the range of 2 to 20% by weight in the sealing agent. In addition, the mixing ratio of the thermosetting agent (b) is preferably in the range of 0.8 to 3.0 equivalent, more preferably 0.9 to 2.0 equivalent of active hydrogen based on the epoxy resin (a) in the sealing agent. If the amount of the thermosetting agent (b) based on the epoxy resin (a) is smaller than 0.8 equivalent, the heat-curing reaction becomes insufficient, which may lower the adhesive strength and glass transition point. On the other hand, if the equivalent is higher than 3.0, the thermosetting agent remains and thereby adhesive strength would decrease and the pot life would deteriorate.

The epoxy (meth)acrylate (c) contained in the combined photocurable and thermosetting sealing agent is not limited in particular, but can be obtained by esterification of the above-described bifunctional or higher functional epoxy resin (a) with (meth)acrylic acid in the presence of a catalyst and a polymerization inhibitor. Examples of the bifunctional or higher functional epoxy resins include a bisphenol A-type epoxy resin, bisphenol F-type epoxy resin, bisphenol S-type epoxy resin, thiodiphenol type epoxy resin, phenol novolak-type epoxy resin, cresol novolak-type epoxy resin, bisphenol A novolak-type epoxy resin, bisphenol F novolak-type epoxy resin, cycloaliphatic epoxy resin, aliphatic series chain epoxy resin, glycidyl ester-typed epoxy resin, glycidyl amine-type epoxy resin, hydantoin-type epoxy resin, isocyanurate-type epoxy resin, phenol novolak-type epoxy resin having a triphenol methane skeleton, and furthermore diglycidyl ether products of bifunctional phenols, diglycidyl ether products of bifunctional alcohols, and the halogenated compounds and the hydrogenated compounds thereof.

As the epoxy (meth)acrylate (c) used here, those having small solubility to the charge transfer layer, for example, a (meth)acrylate of a bifunctional or higher functional aromatic epoxy resin, and a (meth)acrylate of an epoxy resin having an alkylene oxide unit are preferable, and the (meth)acrylate of a bifunctional aromatic epoxy resin is more preferable. Here, particularly preferable examples of the (meth)acrylate having a bifunctional aromatic epoxy resin include a (meth)acrylate of a bisphenol A-type epoxy resin, a (metha)acrylate of a novolak-type epoxy resin, and resorcinol (meth)acrylate.

In addition, the notation of (meth)acrylate in the present invention means both acrylate and methacrylate. The notation of synonym containing (meth), e.g., a (meth)acrylic group or the like, also means both acrylic group and methacrylic group.

In the above-described esterification reaction, one kind or two or more kinds of the diluting solvents may be added as diluents: aromatic hydrocarbon, such as toluene or xylene; esters, such as ethyl acetate and butyl acetate; ethers, such as 1,4-dioxane and tetrahydrofuran; ketones, such as methyl ethyl ketone and methyl isobutyl ketone; glycol derivatives, such as butyl-cellosolve acetate, carbitol acetate, diethylene glycol dimethyl ether, and propyleneglycol monomethylether acetate; alicyclic hydrocarbon, such as cyclohexanone or cyclohexanol; and petroleum solvents, such as petroleum solvents and petroleum naphtha. These dilution solvents, if used, are required to be removed by evaporation under a reduced pressure after completion of the reaction, therefore, a solvent having a low boiling point and high volatility is preferable, specifically use of toluene, methyl ethyl ketone, methyl isobutyl ketone and carbitol acetate is preferable. Use of a catalyst is preferable to promote reaction. The catalyst to be used includes, for example, benzyl dimethylamine, triethylamine, benzyl trimethylammonium chloride, triphenyl phosphine, triphenyl stibine, and the like. The use amount thereof is preferably in the range of 0.1 to 10% by weight, particularly preferably in the range of 0.3 to 5% by weight based on the mixture of the reaction raw materials. To prevent polymerization of (meth)acrylic groups themselves during the reaction, use of a polymerization inhibitor is preferable. Examples of polymerization inhibitors include methoquinone, hydroquinone, methylhydroquinone, phenothiazine and dibutylhydroxytoluene. The use amount thereof is preferably in the range of 0.01 to 1% by weight, particularly preferably 0.05 to 0.5% by weight based on the mixture of the reaction raw materials. The reaction temperature is typically in the range of 60 to 150° C., particularly preferably in the range of 80 to 120° C. Moreover, the reaction time is preferably in the range of 5 to 60 hours.

The amount of the epoxy (meth)acrylate (c) contained in the combined photocurable and thermosetting sealing agent is typically in the range of 5 to 80% by weight in the sealing agent.

The photopolymerization initiator (d) to be used for the combined photocurable and thermosetting sealing agent preferably has sensitivity at the vicinity of i-ray (365 nm) that gives comparatively small effects on characteristics of the charge transfer layer, and is an photopolymerization initiator of low contamination to the charge transfer layer. Examples of such photopolymerization initiators include benzyldimethyl ketal, 1-hydroxycyclohexylphenyl ketone, 2-hydroxy-2-methyl-1-phenyl-propan-1-one, acetophenone-type photopolymerization initiators such as 2-methyl-[4-(methylthio)phenyl]-2-morpholino-1-propane, benzoin-type photopolymerization initiators such as benzyl methyl ketal, thioxanthone-based photopolymerization initiators such as diethylthioxanthone, benzophenone-based photopolymerization initiators such as benzophenone, anthraquinone-based photopolymerization initiators such as 2-ethylanthraquinone, acyl phosphine-based photopolymerization initiators such as 2,4,6-trimethyl benzoyl diphenylphosphine oxide, carbazole-type photopolymerization initiators such as 3,6-bis(2-methyl-2-morpholinopropionyl)-9-n-octylcarbazole, and acridine type photopolymerization initiators such as 1,7-bis(9-acrydyl)heptane. Among these, particularly preferable examples include carbazole-type photopolymerization initiators such as 3,6-bis(2-methyl-2-morpholinopropionyl)-9-n-octylcarbazole and acridine type photopolymerization initiators such as 1,7-bis(9-acrydyl)-heptane.

The amount of the photopolymerization initiator (d) contained in the combined photocurable and thermosetting sealing agent is typically in the range of 0.1 to 3% by weight in the combined photocurable and thermosetting sealing agent. In addition, the mixing ratio of the photopolymerization initiator (d) to the epoxy (meth)acrylate component (c) in the combined photocurable and thermosetting sealing agent is typically in the range of 0.1 to 10 parts by weight, preferably 0.5 to 3 parts by weight based on 100 parts by weight of the component (d). The photopolymerization initiator of less than 0.1 parts by weight gives insufficient photo-curing reaction, while with the concentration over 10 parts by weight, such problems would arise as the contamination to the charge transfer layer by the initiator and the degradation of cured-resin characteristics.

A filler (e) can be added to the combined photocurable and thermosetting sealing agent. The filler (e) to be used includes, for example, fused silica, crystal silica, silicon carbide, silicon nitride, boron nitride, calcium carbonate, magnesium carbonate, barium sulfate, calcium sulfate, mica, talc, clay, alumina (aluminium oxide), magnesium oxide, zirconium dioxide, aluminium hydroxide, magnesium hydroxide, hydrated magnesium silicate, calcium silicate, aluminum silicate, lithium aluminum silicate, zirconium silicate, barium titanate, glass fiber, carbon fiber, molybdenum disulfide, asbesto, and the like. Among these, preferable ones include hydrated magnesium silicate, calcium carbonate, aluminium oxide, crystal silica, fused silica, and the like. One kind or two or more kinds of these fillers may be mixed and used. The average particle diameter of the filler (e) used in the present invention is preferably not greater than 3 μm. The average particle diameter larger than 3 μm would cause a problem of defective gap formation in bonding the upper and lower substrates together when the photoelectric conversion is produced.

When the filler (e) is used in the combined photocurable and thermosetting sealing agent, the content thereof is typically in the range of 5 to 50% by weight, preferably 15 to 25% by weight in the sealing agent. When the content of the filler is lower than 5% by weight, the adhesive strength to the substrate made from glass, plastic, or the like may decrease, so that a decrease or the like in the moisture resistance reliability and the adhesive strength after moisture absorption may occur. Moreover, the content of the filler higher than 40% by weight would cause a problem of defective gap formation for the charge transfer layer in preparing the photoelectric conversion device.

In order to improve the adhesive strength, a silane coupling agent (f) can be added to the combined photocurable and thermosetting sealing agent. As the silane coupling agent (f), any one that improves the adhesive strength between the sealing agent and the substrate can be used. The silane coupling agents to be used include, for example, glycidyl methoxysilanes, such as 3-glycidoxypropyltrimetoxysilane, 3-glycidoxypropylmethyldimetoxysilane, 2-(3,4-epoxycyclohexyl)ethyl trimethoxysilane, N-phenyl-γ-aminopropyl trimethoxysilane, and N-(2-aminoethyl)-3-aminopropylmethyl dimethoxysilane; glycidyl ethoxy silanes, such as 3-aminopropyl triethoxysilane, 3-mercaptopropyl triethoxysilane, vinyltrimetoxysilane, N-(2-(vinylbenzylamino)ethyl)-3-aminopropyl triethoxysilane hydrochloride, 3-methacryloxypropyl triethoxysilane, 3-chloropropyl methyldiethoxysilane, and 3-chloropropyl triethoxysilane. One kind or two or more kinds of these silane coupling agents may be mixed and used. Moreover, among these, silane coupling agents containing an amino group are preferable in obtaining superior adhesive strength. Preferable ones among the silane coupling agents described above include N-(2-aminoethyl)-3-aminopropyl methyl dimethoxysilane, 3-aminopropyl triethoxysilane, N-(2-(vinylbenzylamino)ethyl)-3-aminopropyl triethoxysilane hydrochloride, and the like.

In the present invention, when using the silane coupling agent, the content thereof is typically in the range of 0.2 to 2% by weight in the sealing agent for the photoelectric conversion device of the present invention.

The combined photocurable and thermosetting sealing agent may further contain an ion scavenger (g), as required. The ion scavenger can adsorb and fix impurities, in particular inorganic ions, in the sealing agent, and thus reduce elution of inorganic ions into the charge transfer layer. Therefore, the ion scavenger results in effect of preventing specific resistance of the charge transfer layer from lowering. The ion scavenger is preferably an inorganic compound with an ion capturing capability. Those having a capability to capture phosphoric acid, phosphorous acid, organic carboxylate anions, halogen anions, alkali metal cations, alkaline earth metal cations, and the like are preferable. As the ion scavenger, commercially available ones may be suitably selected and used. In the present invention, in using the ion scavenger (g), the content thereof is typically in the range of 0.01 to 5% by weight in the sealing agent for the photoelectric conversion device of the present invention.

Furthermore, for the purpose of improving the curing reactivity and controlling the viscosity, the combined photocurable and thermosetting sealing agent may contain a monomer and/or oligomer of a curable resin containing a (meth)acrylic group, e.g., (meth)acrylic acid ester. Examples of such monomer and oligomer include the reaction products of dipentaerythritol with (meth)acrylic acid and the reaction products of dipentaerythritol caprolactone with (meth)acrylic acid, but are not particularly limited as long as they have low contamination to the charge transfer layer.

The combined photocurable and thermosetting sealing agent may further contain, as required, an organic solvent, an organic filler, a stress relaxation material, and furthermore an additive agent, such as a pigment, a leveling agent, or an antifoaming agent.

Moreover, as the sealing agent used in the production method of the present invention, in order to prevent leakage of the electrolyte solution used in the photoelectric conversion device, a polyisobutylene-type resin sealing agent or the polyvinylidene chloride, vinylidene chloride-vinyl chloride copolymer, and the like described in JP-A-05-112387 may be also used. In particular, the polyisobutylene type resin sealing agent excels in the sealing performance of the electrolyte solution containing iodine used as the electrolyte solution of the photoelectric conversion device of the present application, and is also excellent in the resistance against the charge transfer layer and the moisture resistance. Accordingly, the polyisobutylene-type resin sealing agent is advantageously used to provide an inner bank when providing a plurality of banks of sealing agent.

In the present invention, in the case where the bank of a sealing agent is formed in the form of multi layers, in an inner bank which contacts the charge transfer layer, for example, a polyisobutylene resin-based sealing agent made by devising the end of isobutylene and controlling the reactivity thereof, or a silicone rubber-based sealing agent, which is a polymer having the principal chain of a repetition of siloxane bonds (SiO-)n and the side chain of an alkyl group or an aryl derivative, may be used. Among these, the polyisobutylene resin-based sealing agent is particularly preferable. These sealing agents are generally in a paste form having flowability when applied, while upon contact with an air, at room temperature, upon application of slight heating, or upon UV irradiation, these sealing agents become rubbery. The polyisobutylene resin-based sealing agent to be used in the present invention can be readily obtained from the market, and include, for example, 11X-128, 31X-088, and the like manufactured by ThreeBond Co., Ltd. Other than these, butadiene-based rubber, butyl rubber, chloroprene-based rubber, natural rubber, and other chain macromolecules may be used. Moreover, for the outer bank which does not directly contact the charge transfer layer, for example, a sealing agent containing a resin, such as the following epoxy resin compositions, excellent in physical strength are preferably used.

The combined photocurable and thermosetting sealing agent can be produced by mixing the epoxy resin (a), thermosetting agent (b), epoxy (meth)acrylate (c), and photopolymerization initiator (d), and furthermore, as required, the above-described filler (e), silane coupling agent (f), and ion scavenger (g) in any order under stirring, as required, so as to be the above-described each content, and then by mixing this uniformly using a mixer, e.g., a triaxial roll, a sand mill, a ball mill, or the like. To remove impurities after mixing, the mixture may be subjected to filtration treatment, as required.

The combined photocurable and thermosetting sealing agent as described above preferably has fewer content of hydrolysable chlorine derived from an epoxy resin in order to reduce contamination of the sealing agent to the charge transfer layer. Therefore, such an epoxy resin is preferably used that a total amount of the hydrolysable chlorine in the epoxy resin (a) and in the epoxy resin used in order to prepare the epoxy (meth)acrylate (c), and in other epoxy resin used is preferably not greater than 600 ppm, more preferably not greater than 300 ppm. The content amount of hydrolysable chlorine in an epoxy resin is as described above.

As the combined photocurable and thermosetting sealing agent in the production method of the present invention, a sealing agent containing a spacer (space controlling material), such as glass fiber, a silica bead, or a resin-bead spacer, may be used. The diameter thereof differs depending on the objective, but is typically in the range of 1 to 100 μm, preferably 4 to 50 μm. The use amount is typically in the range of 0.1 to 4 parts by weight, preferably 0.5 to 2 parts by weight, more preferably 0.9 to 1.5 parts by weight based on 100 parts by weight in the sealing agent.

In the production method of the present invention, one or more banks (columns) of sealing agent can be provided. However, as the number of banks increases, the effective area of the photoelectric conversion device may decrease, and thus, three or fewer banks are preferably provided, and two banks are most preferably provided. The width of the bank is typically in the range of 1 to 500 μm, preferably 10 to 2000 μm.

In the photoelectric conversion device, the area contributing to photoelectric conversion upon receipt of sunlight is preferably wider. Accordingly, in the production method of the present invention, the area of the charge transfer layer and bank is designed so as to be no less than 50%, or preferably no less than 60% relative to a total area of the photoelectric conversion device. Moreover, prior to the step of bonding two substrates together, a part of the conductive substrate may be cut and serially wired with an internal coupling material to form a serial-type photoelectric conversion device in which cells are coupled in series. Furthermore, in the step of bonding two substrates together in a decompression container, substituting the decompressed space with an inert gas, such as nitrogen, argon, or helium, is also preferable.

The respective compositions of sealing agents of a bank on a side which contacts the charge transfer layer and a bank on a side which does not contact the charge transfer layer may differ to each other. That is, for example, for the bank on the side which contacts the charge transfer layer, a sealing agent with a composition difficult to mix with the charge transfer layer may be selected. Moreover, for the bank on the side which does not contact the charge transfer layer, a sealing agent with a composition suitable for improvement in physical strengths, such as tensile strength and distortion strength, may be selected.

Hereinafter, the method for producing the dye-sensitized photoelectric conversion device of the present invention is described. The production method of the present invention comprises the following steps as key ones:

(1) A step of preparing a conductive support having a semiconductor-containing layer sensitized with a dye and a conductive support serving as a counter electrode;

(2) A step of arranging an internal conductive material, as required;

(3) A step of providing a bank of the sealing agent;

(4) A step of arranging a droplet of the charge transfer layer;

(5) A step of bonding two conductive supports together preferably under a reduced pressure; and (6) A step of curing the sealing agent with light and/or heat and thereby strongly adhering the two conductive supports.

Figure 2:
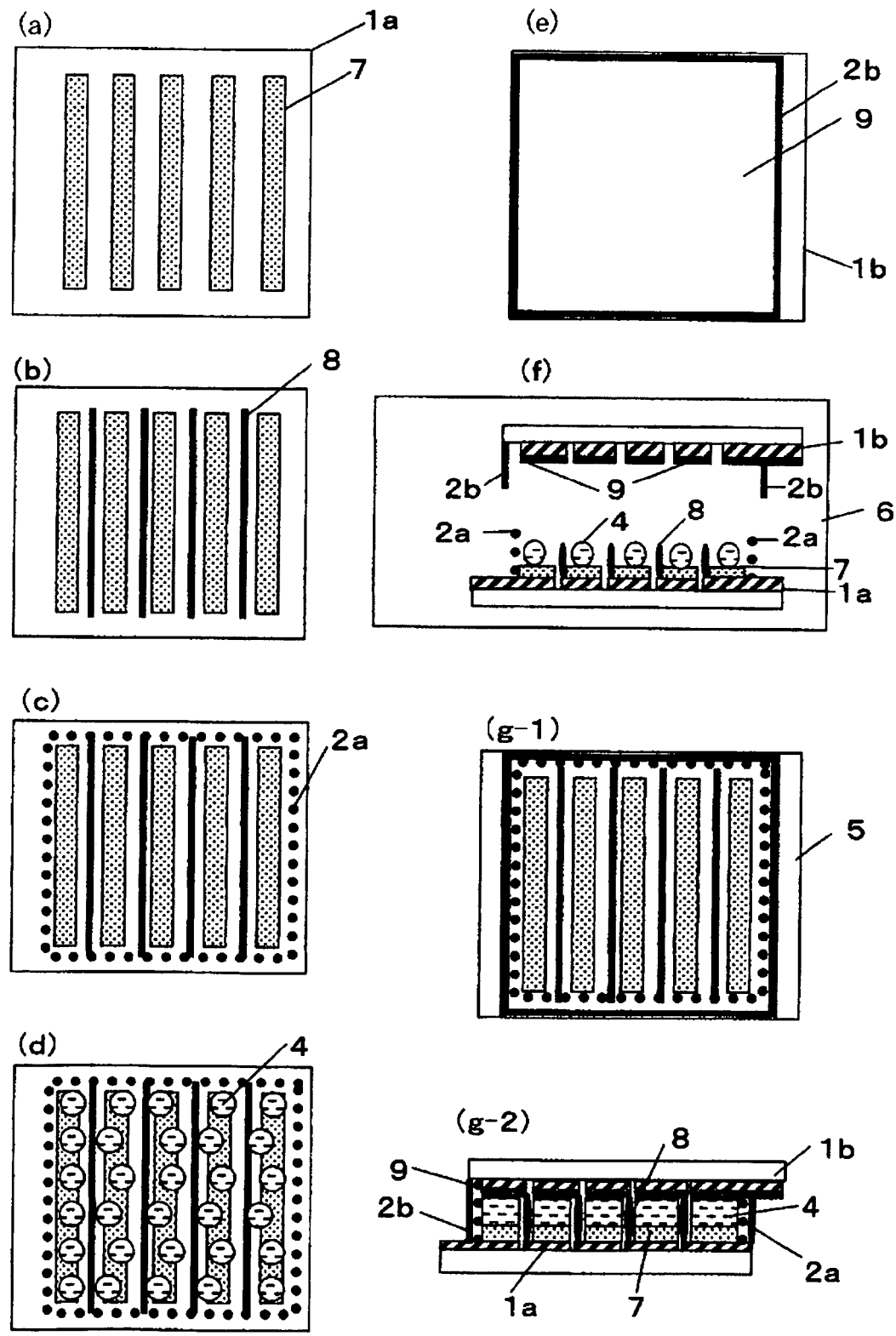
FIG. 2 illustrates steps of manufacturing a photoelectric conversion device having double layers of banks of sealing agent according to the production method of the present invention.

The production method of the present invention for providing the double layers of banks (sealing layers) of sealing agent around the conductive support is described based on FIG. 2. In this embodiment, a polyisobutylene resin-based sealing agent is used in the inner bank which contacts the charge transfer layer, while in the outer layer which does not contact the charge transfer layer a combined photocurable and thermosetting sealing agent is used.

FIG. 2 illustrates the outline of the manufacture process when providing double layers of banks of sealing agent around a conductive support, in which a layer including a semiconductor particulate film sensitized with a dye is provided. Each step is carried out as follows.

First, a part of the conductive surface of the conductive support is cut into a desired shape by a $CO_2$ gas laser, etching, or the like, and semiconductor particles are applied onto this conductive surface and calcined. Next, a sensitization process using a dye is carried out to obtain a conductive support (1a) in which a thin film (semiconductor-containing layer) (7) of semiconductor particles sensitized with the dye is provided (FIG. 2 (a)). Next, a thermosetting resin combined with conductive particles is applied to form internal coupling wirings (internal conductive material) (8) (FIG. 2 (b)). Next, a first sealing agent mixed with spacers is applied to a periphery on the conductive support having a layer containing semiconductor particles by using a screen printing method, a dispensing method, or the like, thereby providing a single layer of bank (2a) of a continuous sealing agent (FIG. 2 (c)). Although the width of the bank is suitably determined eventually depending on whether to form a single layer of bank or multiple layers of banks, it is typically in the range of 1 to 5000 μm, preferably 10 to 2000 μm. Moreover, in forming multiple layers of banks, an interval between the respective banks is typically in the range of approximately 0 to 1 cm, preferably 0 to 5 mm, more preferably 0 to 2.5 mm. In particular, the distance between the innermost bank and the second bank therefrom is preferably a distance described above. Moreover, the shortest distance between the innermost bank and a layer having a semiconductor particulate thin film and existing on the inner side thereof is typically in the range of approximately 0 to 2 mm, preferably 0 to 0.5 mm, and most preferably 0. After providing the banks of sealing agent, these sealing agents may be subjected to a heat treatment (e.g., treated at 100° C. for 10 minutes) for removing the solvent, as required.

Next, a sufficient amount of charge transfer layer (4) to form a desired thickness in a region surrounded by the bank of sealing agent is dropped (arranged) to several places using a liquid discharge device, such as a dispenser (FIG. 2 (d)). In addition, a total amount of charge transfer layer to be dropped is calculated from the area of the region surrounded by the bank of sealing agent, and by the particle diameter of the spacer particle in the sealing agent.

Next, a metal serving as a counter electrode (9) is vapor-deposited to another conductive support (1b) (FIG. 2 (e)), and then the conductive surface and the vapor-deposited metal on the support are cut into a desired shape by a $CO_2$ gas laser, etching, or the like, as described above. In a periphery of this support or on the vapor-deposited metal, a second bank of sealing agent (2b) containing a spacer (space controlling material) is provided as a continuous bank so as to be located, after bonding the both supports together, on the outside of the bank arranged on the conductive support as described above. The both conductive supports are placed in a decompression container (6) under a reduced pressure, and then a predetermined distance is provided between the both, and the both are bonded together with a pressing machine or the like (FIG. 2 (f)). In this case, the bonding of the both conductive supports is carried out at reduced pressure (degree of vacuum) of typically not greater than 3000 Pa, preferably not greater than 1000 Pa. Moreover, the distance provided between the both conductive supports is typically in the range of 1 to 100 μm, preferably 4 to 50 μm.

Next, under atmospheric pressure, to the conductive supports bonded together as described above, a photo irradiation treatment and then a heat treatment are carried out depending on the used sealing agent to cure the sealing agent, thereby completing the adhesion of the both conductive supports. The photo-curing is carried out by irradiation of an ultraviolet ray typically in the range of 500 to 6000 mJ/cm$^2$, preferably 1000 to 4000 mJ/cm$^2$. Moreover, the heat treatment is carried out at 90 to 130° C. for one to two hours. In addition, as the method for carrying out the heat treatment, a method for carrying out this in an oven can be employed, for example. In this way, a photoelectric conversion device (5) with a double sealing layers and without an injection port for injecting the charge transfer layer onto the conductive support is obtained (FIG. 2 (g-1) (top view), FIG. 2 (g-2) (cross sectional view)).

The present invention can be used regardless of the structure (or shape) of the photoelectric conversion device. Other than the photoelectric conversion device (5), the present invention can be used, for example, in the photoelectric conversion devices having structures as shown in FIG. 5 and FIG. 7 described in JP-A-2002-367686, in FIG. 3 described in JP-A-2004-111276, in FIG. 1, FIG. 2, FIG. 6, FIG. 7, and FIG. 8 described in JP-A-2005-235725, in FIG. 7, FIG. 8, and FIG. 9 described in JP-A-2006-236960, and the like. Moreover, the present invention can be also used in the photoelectric conversion devices with the so-called "tandem construction" that is obtained by stacking two or more layers of the photoelectric conversion devices shown in FIG. 1 and FIG. 2 described in JP-A-11-273753 or the like, and in the photoelectric conversion device that combines an electric double layer capacitor or the like.

In the above, the order of the step of providing a bank of sealing agent on a conductive support having a layer containing a semiconductor and the step of dropping (arranging) a charge transfer layer is arbitrary, and the bank of sealing agent may be provided after dropping (arranging) the charge transfer layer.

It is also possible to arrange only the droplet of a charge transfer layer (without providing a bank of sealing agent) onto one of the conductive supports and then bond this to the other conductive support in which a bank of sealing agent is provided.

In the above, the outline of the method for manufacturing a photoelectric conversion device, wherein double layers of banks are provided and a polyisobutylene resin sealing agent is used as the sealing agent for the inner bank and a combined photocurable and thermosetting sealing agent is used as the sealing agent for the outer bank, respectively, and wherein cells are coupled in series, has been described. Photoelectric conversion devices of various forms can be manufactured, for example, by wiring cells in parallel, or by providing triple layers of banks, or by suitably and properly using thermosetting resin-based sealing agent, photocurable resin-based sealing agent, and combined photocurable and thermosetting resin-based sealing agent for the sealing agent used in these banks, or by mixing and using these sealing agents. Moreover, the sealing agent of the inner bank is preferably a resin having the characteristic of preventing leakage of an electrolyte solution. Specifically, examples of this sealing agent include an isobutylene resin-based sealing agent. Moreover, the sealing agent of the outer bank is preferably a resin having a characteristic of satisfactorily bonding the conductive supports together and a characteristic excellent in adhesive strength. Specifically, examples of this sealing agent include an isobutylene resin-based sealing agent, thermosetting resin-based sealing agent, photocurable resin-based sealing agent, and combined photocurable and thermosetting resin-based sealing agent. Among these, the thermosetting resin-based sealing agent, the combined photocurable and thermosetting resin-based sealing agent, and the like are more preferable. As the sealing method, it is also possible to improve the strength or prevent leakage of the electrolyte by further arranging a sealing agent around the cells after curing each bank by any method using light, heat, or the like, or by curing the sealing agent.

Figure 4:
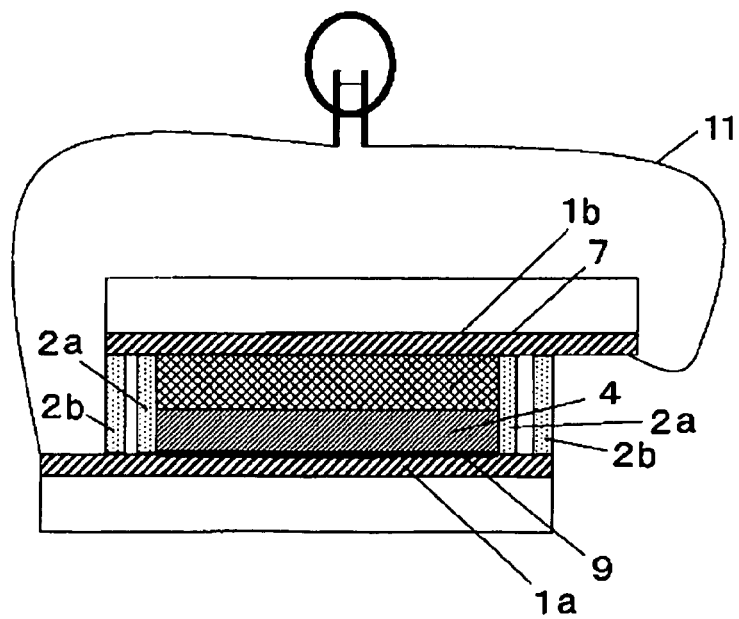
FIG. 4 illustrates an example of a solar cell obtained from a photoelectric conversion device obtained by the production method of the present invention.

The solar cell can be obtained by connecting a lead wire (11) to the positive and negative electrodes of the photoelectric conversion device thus obtained, and by inserting a load (resistance component) between the electrodes (see FIG. 4).

The production method used for the photoelectric conversion device of the present invention causes very little contamination to the charge transfer layer during the production process of the photoelectric conversion device, and excels in the coating operability to the substrate, bondability, and adhesive strength. The photoelectric conversion device thus obtained has few operational defect resulting from the contamination of the charge transfer layer by the sealing agent, and excels in the adhesiveness and the moisture resistance reliability. A solar cell prepared using such photoelectric conversion device can be manufactured efficiently and is also excellent in the durability.

EXAMPLES

The present invention is described further in detail using examples.

Example 1

Preparation of in-Plane Series Cells

Since this example also relates to a photoelectric conversion device, in which two banks are provided and cells are coupled in series as in the above-described embodiment, description is made with reference to FIG. 2.

Conduction of a desired part in the conductive surface of the FTO conductive glass support (1a), which was the conductive support, was cut using a $CO_2$ laser, and a paste prepared by processing a $TiO_2$ microparticle (P25: manufactured by Degussa AG), which is the semiconductor-containing layer (7), was applied onto the conductive surface. After calcination at 450° C. for 30 minutes, the resultant support was dipped into an ethanol solution of $3\times10^{-4}$ M dye represented by Formula (1) below for 24 hours to prepare the semiconductor electrode (FIG. 2 (a)). As the internal coupling wiring, 4 parts by weight of anisotropic conductive microparticles were added to the thermosetting resin (KAYA-TORON ML3600P5E, manufactured by Nippon Kayaku Co., Ltd.) to prepare an internal coupling resin (internal conductive material) (8), which was then applied using a dispenser (FIG. 2 (b)).

Next, a polyisobutylene resin-based sealing agent was applied to the periphery of the semiconductor electrode using a dispenser to provide the bank (2a) inside the sealing agent FIG. 2 (c).

The charge transfer layer (4) ($I_2$ iodine/DMPII: 1,2-dimethyl-3-propyl imidazolium iodide/TBP t-butyl pyridine were prepared with EMI-TFSI: 1-ethyl-3-methyl imidazolium bistrifluoromethane sulfonylimide/3-MPN 3-methoxypropionitrile (95/5% by weight) so as to be 0.05 M/0.5 M/0.5 M, respectively) was dropped inside the bank of a polyisobutylene-based sealing agent (FIG. 2 (d)).

Pt was vapor-deposited in thickness of 100 Å on the conductive surface of the FTO conductive glass support (1b), and then the conduction of a desired part was cut by a $CO_2$ laser to prepare the counter electrode (9). Subsequently, a combined photocurable and thermosetting resin-based sealing agent (U-7100Evo6, manufactured by Nippon Kayaku Co., Ltd.) was applied using a dispenser to provide the bank (2b) of the sealing agent (FIG. 2 (e)).

After overlapping the semiconductor electrode with the counter electrode under a reduced pressure down to 600 Pa in the decompression container (6), a gap uniformizing process was carried out by pressing (FIG. 2 (f)).

After releasing the pressure, the above overlapped one was irradiated with an UV light at 3000 mJ for temporary joint. Subsequently, the resultant one was heated at 120° C. for one hour to complete the adhesion of the both electrodes, thus obtaining the photoelectric conversion device (5) (FIG. 2 (g-1) (top view) and FIG. 2 (g-2) (cross sectional view).

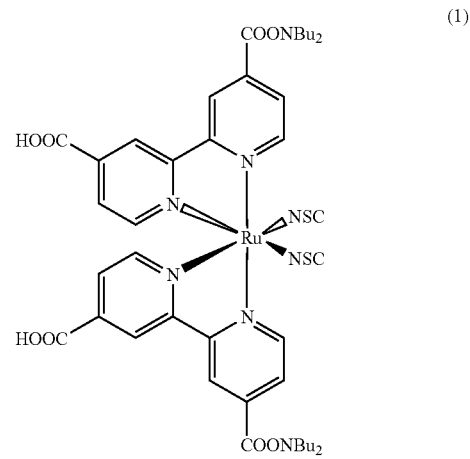

(1)

Example 2

Preparation of Cells Using a Collecting Electrode

Figure 3:
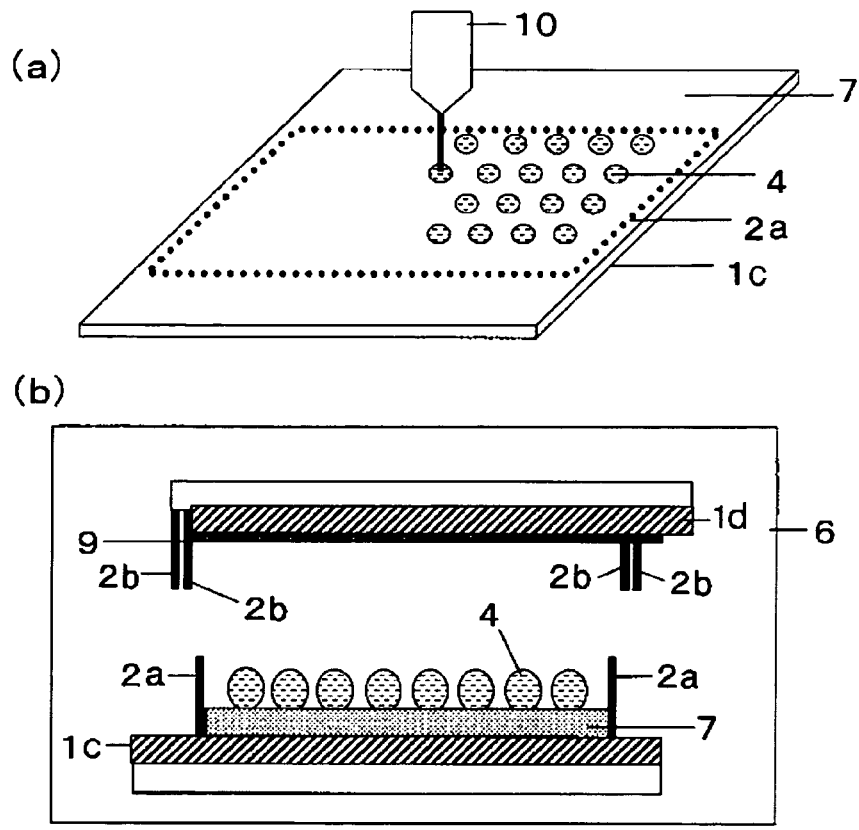
FIG. 3 illustrates an example of a photoelectric conversion device obtained by a conductive support, in which a foundation thin film layer composed of a semiconductive precursor is provided above an arranged collecting electrode of the present invention (Example 2).

As shown in FIG. 3, a paste prepared by processing a $TiO_2$ microparticle (P25: manufactured by Degussa AG) (7), which was the semiconductor-containing layer, was applied onto the conductive surface of an FTO conductive glass support (1c) serving as the conductive support, in which a collecting electrode was arranged, and then the paste-applied support was calcined at 450° C. for 30 minutes. Subsequently, the above calcined support was dipped in a $3\times10^{-4}$ M ethanol of a dye represented by Formula (1) for 24 hours to prepare a semiconductor electrode. Then, a polyisobutylene resin-based sealing agent was applied to the periphery of the semiconductor electrode using a dispenser to provide the single layer of bank (2a) of sealing agent. Subsequently, the charge transfer layer (4) prepared in Example 1 was dropped to the interior of the bank of the polyisobutylene-based sealing agent using a dropping device (10).

Next, Pt was vapor-deposited in thickness of 100 Å on the conductive surface of an FTO conductive glass support (1d), in which a collecting electrode was arranged, thereby preparing the counter electrode (9). Subsequently, the combined photocurable and thermosetting resin-based sealing agent (U-7100Evo6, manufactured by Nippon Kayaku Co., Ltd.) was applied in the form of double layers using a dispenser to provide the double layers of banks (2b). The distance between the inner and outer banks was set to 2.5 mm. Moreover, the distance between the inner bank and the semiconductor-containing layer arranged on the further inner side was set to 0.75 mm. Then, after overlapping the semiconductor electrode with the counter electrode under a reduced pressure down to 600 Pa in the decompression container (6), a gap uniformizing process was carried out by pressing. After releasing the pressure, the above overlapped one was irradiated with an UV light at 3000 mJ for temporary joint. Subsequently, the resultant one was heated at 120° C. for one hour to complete the adhesion of the both electrodes, thus obtaining the photoelectric conversion device.

Example 3

As the internal coupling resin, a graphite conductive paint was applied using a dispenser. With the other conditions being the same as those of Example 1, a photoelectric conversion device of the present invention was obtained.

Examples 4 to 22

In accordance with Example 1, photoelectric conversion devices of the present invention were obtained, respectively, using the respective components of the dyes, sealing agents, and internal coupling resins shown in Table 1.

TABLE 1

| | dye | sealing agent 1 | sealing agent 2 | sealing agent 3 | internal coupling resin |
|---|---|---|---|---|---|
| Example 4 | A | D | E | E | H |
| Example 5 | A | D | E | — | H |
| Example 6 | B | D | E | E | F |
| Example 7 | B | D | E | E | G |
| Example 8 | B | D | E | E | H |
| Example 9 | C | D | E | E | F |
| Example 10 | C | D | E | E | G |
| Example 11 | C | D | E | E | H |
| Example 12 | C | D | I | I | F |
| Example 13 | C | D | J | J | F |
| Example 14 | C | D | K | K | F |
| Example 15 | C | D | L | L | F |
| Example 16 | C | D | M | M | F |
| Example 17 | C | D | N | N | F |
| Example 18 | C | D | O | O | F |
| Example 19 | C | N | D | — | F |
| Example 20 | C | E | D | E | F |
| Example 21 | C | E | D | — | F |
| Example 22 | C | D | P | — | F |

The meanings of symbols, abbreviations, and the like in Table 1 are as follows.

[Dye]
A: compound (dye) represented by Formula (1) above
B: compound (dye) represented by Formula (2) below
C: compound (dye) represented by Formula (3) below

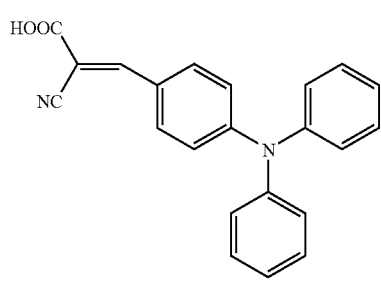

(2)

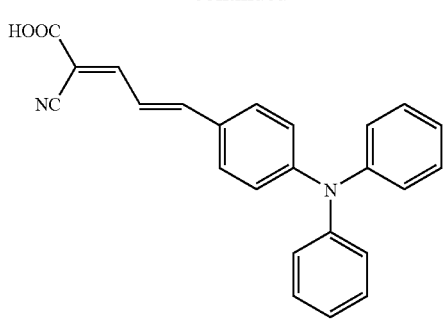

(3)

[Sealing Agent]
D; polyisobutylene resin sealing agent
E; combined photocurable and thermosetting resin-based sealing agent (U-7100Evo6 manufactured by Nippon Kayaku Co., Ltd.)
I; thermosetting resin-based sealing agent (sealing agent described in Example 1 of JP-A-10-273644)
J; thermosetting resin-based sealing agent (sealing agent described in Example 2 of JP-A-10-273644)
K; thermosetting resin-based sealing agent (sealing agent described in Example 3 of JP-A-10-273644)
L; thermosetting resin-based sealing agent (sealing agent described in Example 4 of JP-A-10-273644)
M; thermosetting resin-based sealing agent (sealing agent described in Example 5 of JP-A-10-273644)
N; combined photocurable and thermosetting resin-based sealing agent (sealing agent described in Example 1 of JP-A-2004-37937)
O; combined photocurable and thermosetting resin-based sealing agent (sealing agent described in Example 2 of JP-A-2004-37937)
P: Combined photocurable and thermosetting resin-based sealing agent (sealing agent described in Example 1 of JP-A-2002-317172)

[Internal Coupling Resin]
F; thermosetting resin (KAYATORON ML3600P5E (manufactured by Nippon Kayaku Co., Ltd.))+anisotropic conductive microparticle
G; graphite conductive paint
H; graphite conductive paint+anisotropic conductive microparticle Preparation of a Solar Cell, and Measurement of Conversion Capability The solar cell was obtained by connecting a lead wire to the positive electrode and negative electrode of each of the photoelectric conversion devices obtained in Examples 1 to 4 (FIG. 4 illustrates an example). The positive electrode and negative electrode of each of these solar cells were connected to a solar simulator (WXS-155S-10 manufactured by Wacom Co., Ltd.) to measure the short circuit photocurrent, open circuit voltage, and conversion efficiency. Moreover, by using a 1000 W xenon lamp (manufactured by Wacom Co., Ltd.) as the light source, pseudo sunlight (with light intensity of 100 mW/cm$^2$) was obtained through a commercially available Air mass filter-1.5.

The measurement results of the short-circuit current (mA/cm$^2$), open circuit voltage (V), and conversion efficiency (%) of the respective solar cells are summarized in Table 2.

TABLE 2

|  | short circuit photocurrent (mA/cm²) | open circuit voltage (V) | conversion efficiency (%) |
|---|---|---|---|
| Example 1 | 2.1 | 2.8 | 3.0 |
| Example 2 | 10.3 | 0.6 | 3.1 |
| Example 3 | 2.0 | 2.7 | 2.8 |
| Example 4 | 2.3 | 3.0 | 3.5 |

Durability Test

A durability test was carried out to the solar cells prepared from the photoelectric conversion devices obtained in Examples 1 to 4. The solar cells 1 to 4 were operated at a constant temperature (25° C.) for 60 days, and the conversion efficiency (%) was measured at the beginning, after 30 days, and after 60 days, respectively, and the results are summarized in Table 3.

As apparent from Table 3, a noticeable degradation in the conversion efficiency of each cell was not found at any time point, and each cell exhibited an excellent durability.

TABLE 3

|  | initial value (%) | after 30 days (%) | after 60 days (%) |
|---|---|---|---|
| Example 1 | 3.0 | 2.9 | 3.0 |
| Example 2 | 3.1 | 3.0 | 3.0 |
| Example 3 | 2.8 | 2.6 | 2.7 |
| Example 4 | 3.5 | 3.3 | 3.6 |

As apparent from the results of Table 2 and Table 3, the photoelectric conversion devices obtained using the production method of the present invention have excellent electrical performances, such as the conversion efficiency, and are also excellent in the durability.

The invention claimed is:

1. A photoelectric conversion device, comprising: a first conductive support having a layer containing a semiconductor; a second conductive support arranged opposite to the first conductive support and having a counter electrode; a charge transfer layer interposed between the first conductive support and the second conductive support at a predetermined distance from the supports; and a bank of a continuous sealing agent which is arranged around the charge transfer layer in the form of a double or more layers and is interposed between the first conductive support and the second conductive support at a predetermined distance from said supports, wherein the bank of the continuous sealing agent adheres to the first conductive support and the second conductive support, wherein the photoelectric conversion device has neither an injection port for injecting said charge transfer layer nor a sealed portion of the injection port on the conductive supports and said bank of the continuous sealing agent, wherein the composition of the sealing agent used in a portion which contacts said charge transfer layer differs from that of the sealing agent in a portion which does not contact said charge transfer layer.

2. The photoelectric conversion device according to claim 1, wherein the sealing agent serving as the innermost bank is an isobutylene resin-based sealing agent, and a sealing agent serving as a bank on the first outer side thereof is a thermosetting resin-based sealing agent or a combined photocurable and thermosetting-resin based sealing agent.

3. The photoelectric conversion device according to claim 1 or 2, wherein a plurality of cells exist inside a pair of the first conductive support and the second conductive support, each cell being arranged in series electrically.

4. The photoelectric conversion device according to claim 1, or 2, wherein a collecting electrode is arranged on the first conductive support, and a foundation thin film layer made from a semiconductor precursor is provided on the collecting electrode.

5. The photoelectric conversion device according to claim 1, or 2, wherein a distance between the sealing agent serving as the innermost bank and the sealing agent serving as the bank on the first outer side thereof is in the range of 0 to 1 mm.

6. The photoelectric conversion device according to claim 5, wherein a distance between the sealing agent serving as the innermost bank and a layer containing a semiconductor arranged on a further inner side thereof is in the range of 0 to 2 mm.

7. The photoelectric conversion device according to claim 3, wherein a collecting electrode is arranged on the first conductive support, and a foundation thin film layer made from a semiconductor precursor is provided on the collecting electrode.

8. The photoelectric conversion device according to claim 3, wherein a distance between the sealing agent serving as the innermost bank and the sealing agent serving as the bank on the first outer side thereof is in the range of 0 to 1 mm.

9. The photoelectric conversion device according to claim 2, wherein a distance between the sealing agent serving as the innermost bank and a layer containing a semiconductor arranged on a further inner side thereof is in the range of 0 to 2 mm.

10. The photoelectric conversion device according to claim 8, wherein a distance between the sealing agent serving as the innermost bank and a layer containing a semiconductor arranged on a further inner side thereof is in the range of 0 to 2 mm.

* * * * *